(12) United States Patent
Cobb, Jr.

(10) Patent No.: US 6,460,494 B1
(45) Date of Patent: Oct. 8, 2002

(54) COMPRESSED AIR ASSISTED FUEL INJECTION SYSTEM WITH REFLECTION WAVE AND VARIABLE RESTRICTION INJECTION PORT

(75) Inventor: William T. Cobb, Jr., St. Petersburg, FL (US)

(73) Assignee: Design & Manufacturing Solutions, Inc., Tampa, FL (US)

( * ) Notice: Subject to any disclaimer, the term of this patent is extended or adjusted under 35 U.S.C. 154(b) by 34 days.

(21) Appl. No.: 09/589,508

(22) Filed: Jun. 7, 2000

(51) Int. Cl.[7] .............................................. F02B 33/04
(52) U.S. Cl. ................. 123/73 PP; 123/65 P; 123/65 PD; 123/73 B
(58) Field of Search ................. 123/73 C, 73 A, 123/73 AV, 73 AC, 73 AE, 73 PP, 73 B, 65 PD, 65 P

(56) References Cited

U.S. PATENT DOCUMENTS

| | | | |
|---|---|---|---|
| 1,722,951 A | * 7/1929 | Barkeij | 123/73 A |
| 2,796,054 A | * 6/1957 | Miller | 123/65 VB |
| 4,258,670 A | 3/1981 | Thery | 123/73 B |
| 4,337,054 A | 6/1982 | Holtermann et al. | |
| 4,545,200 A | 10/1985 | Oike et al. | |
| 4,625,688 A | * 12/1986 | Takayasu | 123/73 B |
| 4,905,646 A | 3/1990 | Tanahashi | |
| 4,944,255 A | 7/1990 | Duret | 123/65 EM |
| 4,995,349 A | 2/1991 | Tuckey | 123/65 VB |
| 5,027,765 A | 7/1991 | Duret | 123/316 |
| 5,740,767 A | * 4/1998 | Kaku et al. | 123/65 W |
| 5,960,749 A | * 10/1999 | Isomura et al. | 123/48 D |
| 6,079,379 A | * 6/2000 | Cobb, Jr. | 123/73 B |
| 6,230,672 B1 | * 5/2001 | Ishibashi et al. | 123/65 P |
| 6,273,037 B1 | * 8/2001 | Cobb, Jr. | 123/73 B |
| 6,293,235 B1 | * 9/2001 | Cobb, Jr. | 123/73 B |

FOREIGN PATENT DOCUMENTS

| | | | | |
|---|---|---|---|---|
| WO | WO 00/55488 | * | 9/2000 | F02M/17/00 |
| WO | WO 01/94763 A1 | * | 12/2001 | F02B/15/00 |

* cited by examiner

Primary Examiner—Tony M. Argenbright
Assistant Examiner—Hai Huynh
(74) Attorney, Agent, or Firm—Harrington & Smith, LLP

(57) ABSTRACT

An internal combustion engine having a combustion chamber and a fuel delivery system for delivering fuel into the combustion chamber. The fuel delivery system includes a fuel entry proximate the combustion chamber, a combustion compression wave reflection conduit connected to the combustion chamber proximate the fuel entry, and a movable member located proximate the reflection conduit for at least partially opening and closing a path through the reflection conduit.

19 Claims, 10 Drawing Sheets

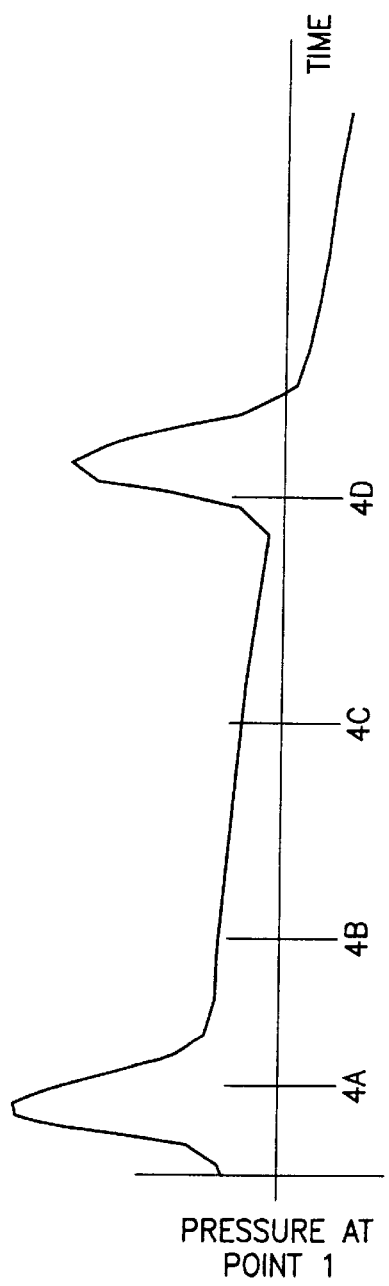
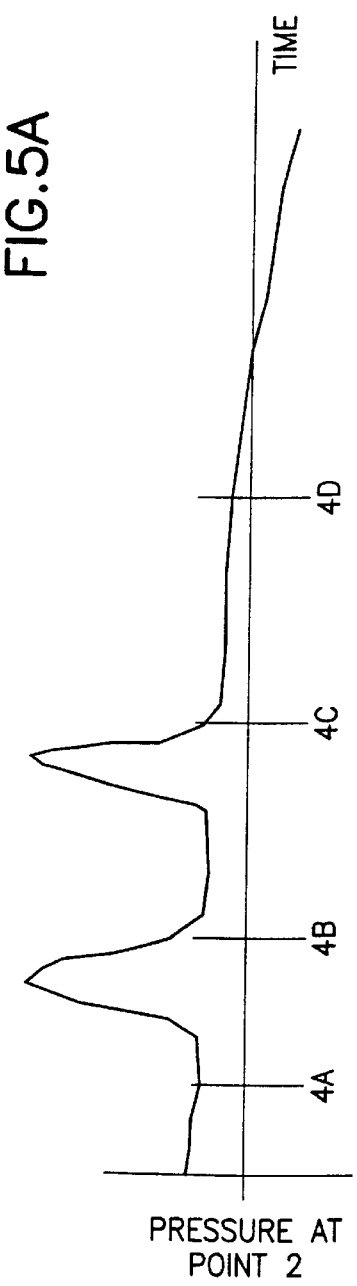
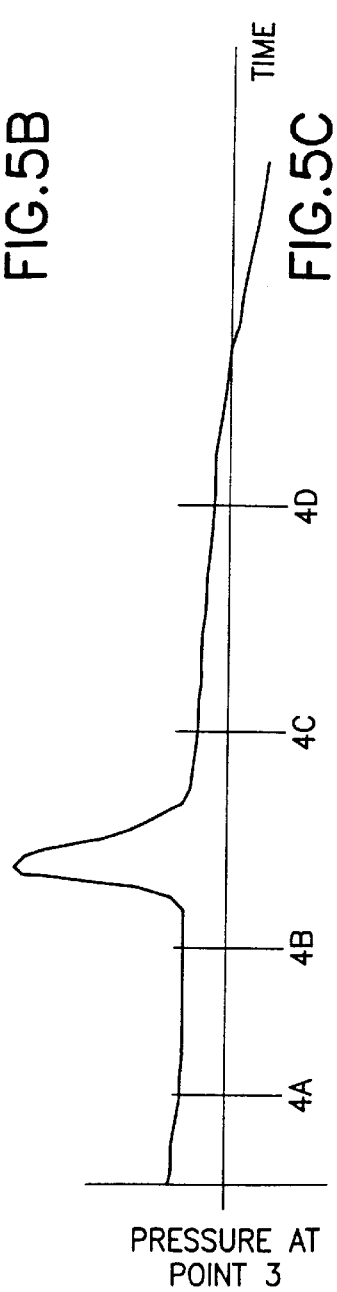

COMPRESSED AIR ASSISTED FUEL INJECTION SYSTEM WITH REFLECTION WAVE AND VARIABLE RESTRICTION INJECTION PORT

BACKGROUND OF THE INVENTION

1. Field of the Invention

The present invention relates to fuel injection systems for internal combustion engines and, more specifically, to a control system for a two-stroke engine.

2. Prior Art

U.S. Pat. No. 4,258,670 discloses a transfer pipe in a two stroke engine having a check valve and fuel entry into the transfer pipe. U.S. Pat. No. 5,027,765 discloses a pipe with a check valve having an entrance above a piston head and an exit at a fuel injector. U.S. Pat. No. 4,995,349 discloses a transfer passage for air which has a valve which is moved by an electromagnetic coil.

SUMMARY OF THE INVENTION

In accordance with one embodiment of the present invention, an internal combustion engine is provided comprising a combustion chamber and a fuel delivery system for delivering fuel into the combustion chamber. The fuel delivery system includes a fuel entry proximate the combustion chamber, a combustion compression wave reflection conduit connected to the combustion chamber proximate the fuel entry, and a movable member located proximate the reflection conduit for at least partially opening and closing a path through the reflection conduit.

In accordance with another embodiment of the present invention, an internal combustion engine fuel delivery assist is provided comprising a combustion compression wave reflector comprising a conduit; and a control system connected to the reflector for at least partially controlling the reflector to vary timing or shape of delivery of a reflected combustion compression wave to a predetermined location of an engine. The control system comprises a movable member which is movable relative to the conduit to vary a size of a compression wave path through a portion of the conduit.

In accordance with one method of the present invention, a method of delivering a pressure pulse in an internal combustion engine is provided comprising steps of producing a combustion compression wave from combustion in a combustion chamber of the engine; conduiting at least a portion of the wave in a reflection pipe conduit connected to the combustion chamber; reflecting the wave portion in the conduit back towards the combustion chamber; and varying timing of delivery or shape of the reflected wave portion from entry into the conduit back to an exit from the conduit into the combustion chamber, wherein the step of varying comprises moving a movable member in a path of the reflection pipe conduit to increase and decrease a path through the conduit.

BRIEF DESCRIPTION OF THE DRAWINGS

The foregoing aspects and other features of the present invention are explained in the following description, taken in connection with the accompanying drawings, wherein:

FIGS. 5A–5C are pressure diagrams of for three points along the length of the accumulator conduit;

DETAILED DESCRIPTION OF THE PREFERRED EMBODIMENT

Figure 1A:
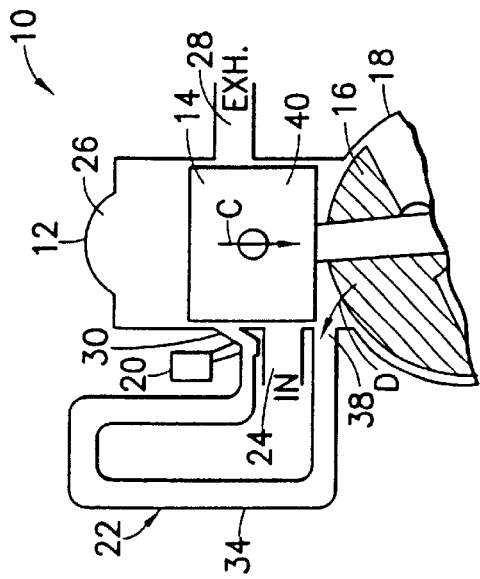
FIGS. 1A–1E are partial schematic diagrams of an engine incorporating features of the present invention with the piston head at various different operational positions.

Referring to FIG. 1A, there is shown a schematic view of an internal combustion engine 10. Although the present invention will be described with reference to the embodiments shown in the drawings, it should be understood that the present invention can be embodied in many alternate forms of embodiments. In addition, any suitable size, shape or type of elements or materials could be used.

The engine 10 is a two-stroke engine having a cylinder 12, a piston 14, a crankshaft 16, a crankcase 18, and a fuel injection system 22 having a fuel metering system 20. The present invention relates to the control of a low pressure injection in an internal combustion engine. A particular field of application of the invention is a two-stroke internal combustion engine. The specific application described is to a small high speed two-stroke engine, such as utilized in handheld power equipment such as leaf blowers, string trimmers and hedge trimmers, also in wheeled vehicle applications such as mopeds, motorcycles and scooters and in small outboard boat engines. The small two-stroke engine has many desirable characteristics, that lend themselves to the above applications, including: simplicity of construction, low cost of manufacturing, high power-to-weight ratios, high speed operational capability and, in many parts of the world, ease of maintenance with simple facilities. The prominent drawback of the simple two-stroke engine is the loss of a portion of the fresh unburned fuel charge from the cylinder during the scavenging process. This leads to poor fuel economy and, most importantly, high emission of unburned hydrocarbon, thus rendering the simple two-stroke engine incapable of compliance with increasingly stringent governmental pollution restrictions. This drawback can be relieved by separating the scavenging of the cylinder, with fresh air, from the charging of the cylinder, with fuel. This separation can be achieved by injecting the liquid fuel into the cylinder or more preferably by injecting the fuel charge by utilizing a pressurized air source, separate from the fresh air scavenge, to spray the fuel into the cylinder. In a preferred embodiment of the present invention, the displacement size of the engine is about 16 cc to about 100 cc, but could be larger or smaller. These sizes of engines are used for such things as string trimmers, chain saws, leaf blowers, and other hand held power tools. The engine could also be used on a tool such as a lawn mower, snow blower or motor boat outboard engine. The cylinder 12 has a spark plug (not shown) connected to its top, a bottom which is connected to the crankcase 18, an air inlet 24, a combustion chamber 26, an exhaust outlet 28, and an injection port or inlet 30 into the combustion chamber. The fuel metering system 20 could be any suitable type of system, such as a carburetor or electronic fuel injector. However, an advantage of the present system is that there is no need for high precision timing or spray quality for the fuel metering system. A relatively simple metering system that delivers drops of fuel could be used. In the embodiment shown in FIG. 1A the injection port 30 is an open type of port; i.e.: with no flow check valve into the combustion chamber 26. However, an alternate embodiment could be provided which has a flow check valve at its injection port, such as disclosed in U.S. patent application Ser. No. 09/065,374 which is hereby incorporated by reference in its entirety. However, any suitable check valve could be used. The injection port 30 is located in a side wall of the cylinder 12 and is shaped to input fuel and air in an upward direction towards the top of the cylinder head. However, in alternate embodiments the inlet could be located in the top of the cylinder head or be shaped to direct fuel towards the top of the piston 14.

The fuel injection system 22 is a compressed air assisted system. The injection system 22 comprises an accumulator 34. The accumulator 34, in this embodiment, has an inlet 38 connectable to pressure inside the crankcase 18 and an exit at the injection port 30. The accumulator 34 functions as a collector and temporary storage area for compressed air. In this embodiment the source of the compressed air is air scavenged from the crankcase 18. The piston 14 compresses the air in the crankcase 18 on the piston's downward stroke. In a preferred embodiment the two apertures 30, 38 are both provided in the cylinder 12; one above the air inlet 24 and one below the air inlet. In the preferred embodiment both apertures 30, 38 are piston ported. In other words, the piston head 40 is sized and shaped to open and close access through the apertures 30, 38 as the piston head 40 reciprocates up and down in the cylinder 12. The accumulator 34, in this embodiment, is a simple channel between the two apertures 30, 38. However, in alternate embodiments more complicated shapes could be provided as further understood from the description below. The channel 34 could be partially machined into an exterior surface of the cylinder 12 with a cap then being attached to the cylinder to form and enclose the channel 34 with only the two apertures 30, 38. However, the accumulator could be provided in a separate member attached to the cylinder 12. In the preferred embodiment an exit from the fuel metering system 20 is located in the channel 34 proximate the injection port 30.

As will be further described below, the fuel injection system 22 has minimal moving parts; merely whatever moving parts are in the fuel metering device 20. Otherwise, the fuel injection system 22 uses the piston head 40 to open and close its ports 30, 38. Timing of the opening and closing of the ports 30, 38 will be dependent upon location of the ports along the length of the cylinder 12. Referring to FIGS. 1A–1E and 2 the operation of the injection system will now be described. FIG. 2 is intended to illustrate a line of events of opening and closing of the apertures 30, 38 during a single full piston cycle (which results from a 360° rotation of the crankshaft 16) as a 360° chart corresponding to piston head location as based upon angular position of the crankshaft 16 starting at the top dead center (TDC) position of the piston 14. Area A indicates when the piston head 40 blocks the aperture 30. Area B indicates when the piston head 40 blocks the aperture 38. At TDC the inlet 30 is blocked by the side of the piston head 40. At TDC the aperture 38 is open. The air inlet 24 is closed by the piston head at position IC which is about 60° after top dead center (ATDC). FIG. 1A shows the piston head 40 at about 90° ATDC as indicated by position 1A in FIG. 2 moving downward in the cylinder 12 as shown by arrow C away from the top dead center position of the piston head. The piston head 40 is blocking the inlet 30, the exhaust outlet 28 and the air inlet 24, but the aperture 38 is open. With the piston head 40 moving towards the crankcase 18, air from inside the crankcase 18 is pushed into the accumulator 34 through the aperture 38 as indicated by arrow D.

Figure 3:
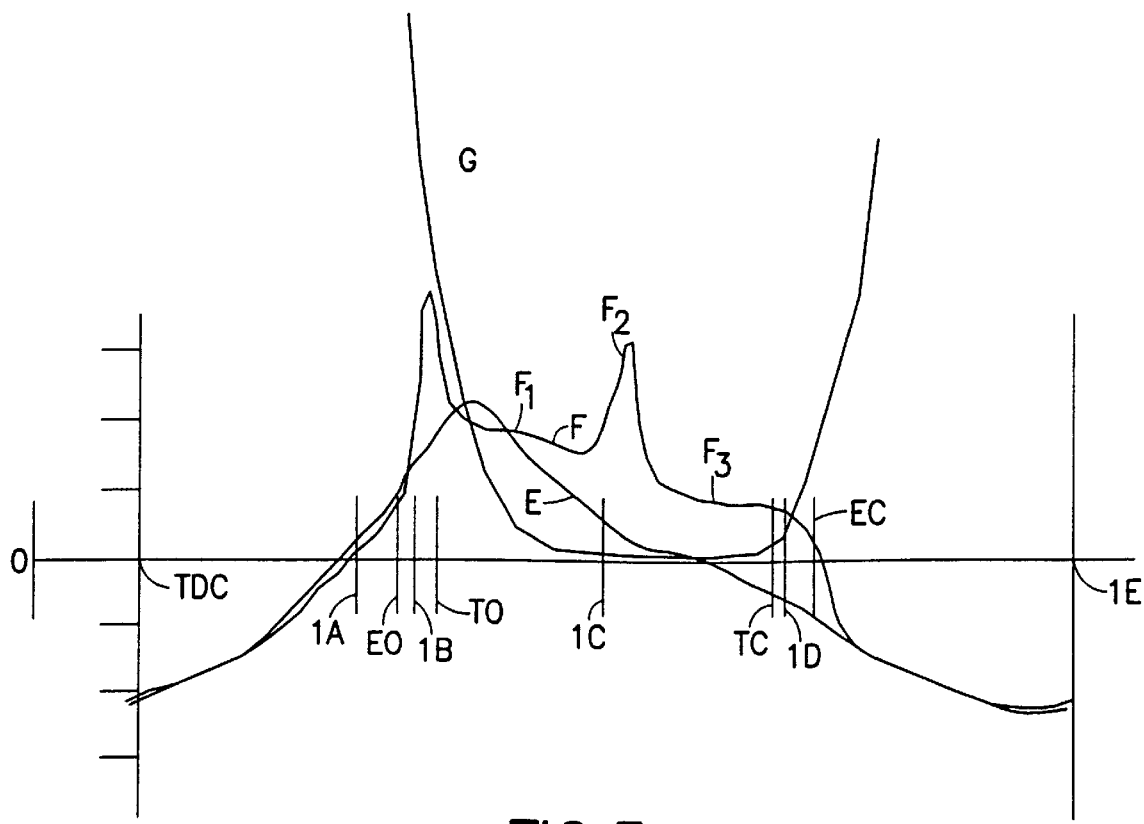
FIG. 3 is a graph of pressures in the crankcase, combustion chamber and accumulator relative to piston head positioning in the cylinder.

Referring also to FIG. 3, a graph of pressures during a single piston cycle are shown relative to zero gage, pressure of one atmosphere. At TDC the pressure E in the crankcase 18 and the pressure F in the accumulator 34 at the inlet 30 are substantially the same. They remain substantially the same as the piston head moves through position 1A. As the piston head 40 continues to move down in the cylinder 12 the exhaust outlet 28 is opened at E0. Pressure G in the combustion chamber 26, caused by expanding gases from combustion, starts to drop.

Figure 1B:
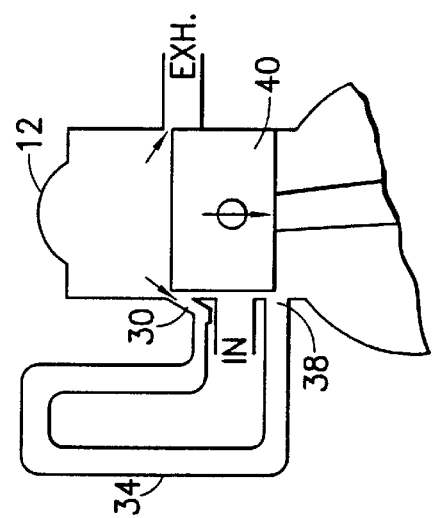
Figure 1C:
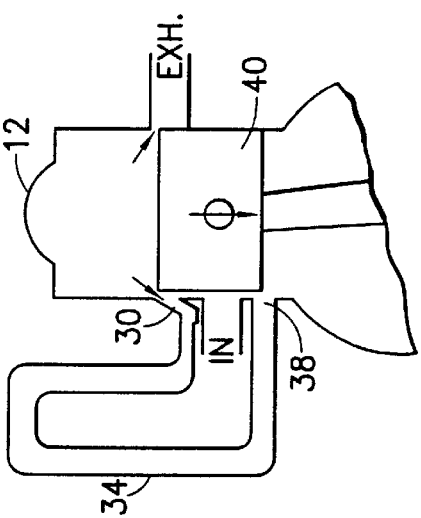
Figure 2:
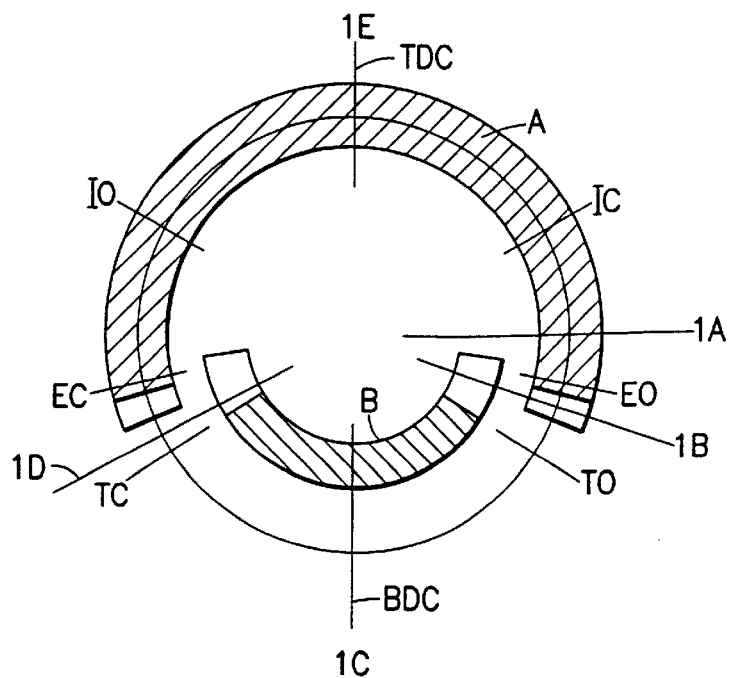
FIG. 2 is a diagram illustrating open and closed positions of the two apertures of the accumulator based upon crankcase rotation and resulting piston head positioning.

As the piston head 40 moves towards position 1B, illustrated in FIG. 1B, the aperture 30 is beginning to be opened, as the piston head 40 uncovers the aperture 30, and the aperture 38 is beginning to be closed, as the piston head 40 starts to block the aperture 38. The piston head uncovers the inlet 30 at about 100° of rotation of the crankshaft after TDC (ATDC). In this embodiment the piston head 40 completely closes the aperture 38 at about the same time the piston head opens access to the transfer channel 42 (see FIG. 1C) at position TO when the transfer 42 opens.

Figure 4A:
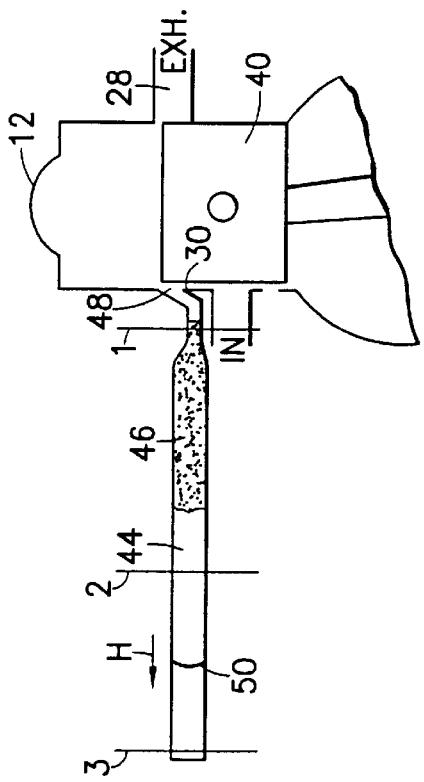
FIGS. 4A–4D are schematic diagrams similar to FIG. 1A for piston locations between 1B and 1C of FIG. 2 and showing compression wave and reflected compression wave movement.

Referring also to FIGS. 4A–4D pressures and movement of gases in the accumulator 34 during the period between 1B and 1C will be further described. FIGS. 4A–4D schematically illustrate the accumulator 34 as a closed end pipe. This is because the aperture 38 is effectively closed by the piston head 40 substantially entirely while the aperture 30 is open. FIG. 4A generally corresponds to position 1B. In this position the accumulator 34 has a volume 44 of compressed air, a volume 46 of compressed air and fuel, and the beginning of a slight buffer 48 of combustion gases. In addition, a compression wave 50 enters the accumulator 34 from the aperture 30 and travels down the accumulator at the speed of sound as illustrated by arrow H towards the now closed aperture $38_{closed}$. Pressure F at the inlet 30, as seen in FIG. 3, spikes upward at 1B because of entry of combustion gases into the inlet 30 and entry of the compression wave 50.

Figure 4C:
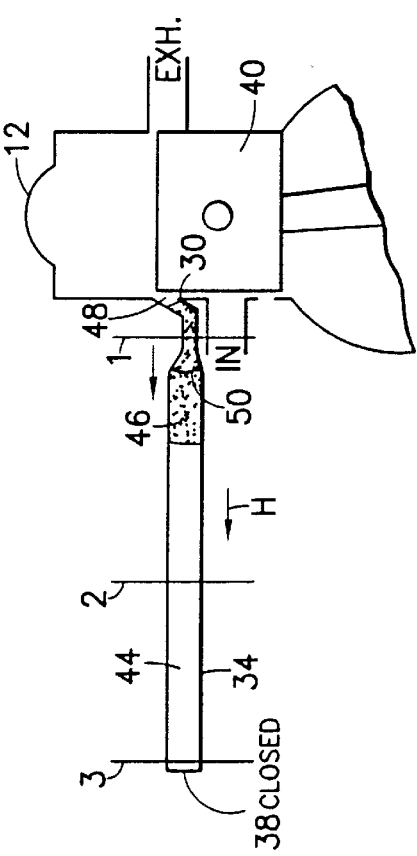
Figure 4B:
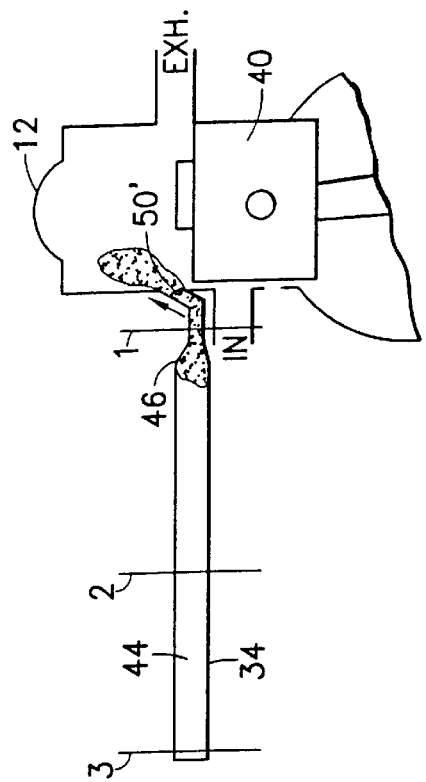
Figure 4D:
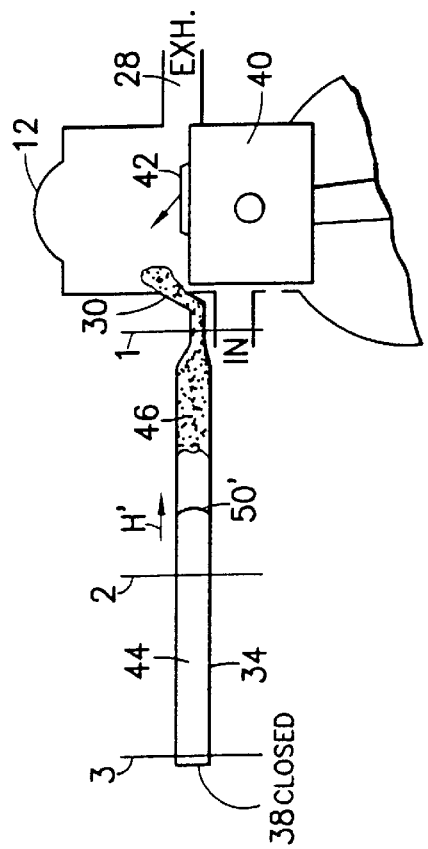

FIG. 4B corresponds to a short time later. The buffer 48 of combustion gases has further pushed into the inlet 30. The buffer 48 helps to heat the inlet 30 and helps to prevent fuel in the accumulator from directly short circuiting to the exhaust outlet 28. The compression wave 50 has moved further down the accumulator 34. FIG. 4C corresponds to a short time after the transfer 42 has opened at point TO. As seen in FIG. 3, the pressure F at the inlet 30 is now higher than the pressure G in the combustion chamber because of gases exiting the exhaust outlet 28. Therefore, the buffer 48 is pushed into the cylinder 12 (acting as a delay before entry of the air and fuel 46) and the air and fuel 46 start to enter the cylinder 12. The compression wave 50 has reflected off of the closed aperture $38_{close}$ and, more specifically, reflected off of the side of the piston head 40 covering the aperture 38. Thus, the compression wave 50 has become the reflected compression wave 50'. The reflected compression wave 50' is now traveling up the accumulator 34 back towards the inlet 30 as indicated by arrow H'. FIG. 4D corresponds to about the position 1C when the piston head is at bottom dead center (BDC). This generally corresponds to the BDC position shown in FIG. 1C. The reflected compression wave 50' arrives at the inlet 30 and exits into the cylinder 12. This causes a second spike in the pressure F at the inlet 30 as seen on FIG. 3. This second spike of pressure helps to propel fuel and air into the cylinder 12 at an accelerated rate. The compression wave is essentially an acoustic wave. Thus, the wave travels at the speed of sound. The timing of the delivery of the reflected compression wave back to the injection inlet 30 can be varied by varying the length of the accumulator conduit. A shorter accumulator conduit will deliver the reflected wave sooner and a longer accumulator conduit will deliver the reflected wave later. Thus, the length of the accumulator conduit 34 can be selected to deliver the reflected compression wave back to the injection inlet 30 at any suitable time. As shown in FIG. 3, there are three general groups of pressures of air and fuel $F_1$, $F_2$, $F_3$ exiting the inlet 30 into the cylinder and, thus, three corresponding rates of flow during these three pressure periods. Hence, a first volume from the inlet 30 will enter the cylinder 12 at a first rate, a subsequent second volume will enter the cylinder at a second higher rate, and a subsequent third volume will enter the cylinder at a third lower rate. However, in an alternate embodiment the accumulator can be configured to deliver the reflected compression wave closer to the period 1D when the inlet 30 is about to be closed. Thus, only two different rate periods need be provided. Alternatively, the accumulator could be configured to deliver more than one reflected compression wave back to the inlet 30, such as by providing the accumulator with multiple channels or multiple reflection surfaces. In effect, by closing the aperture 38 and using the closed aperture as a reflection area, the accumulator 34 functions as a tuned reflection pipe for the compression wave 50.

Referring also to FIGS. 5A–5C, charts of pressure on a reference scale at points 1, 2 and 3 in FIGS. 4A–4D are shown relative to time. Pressure at point 1 increases at time 4A corresponding to FIG. 4A when the compression wave enters the inlet 30. The pressure at point 1 trails off at times 4B and 4C corresponding to FIGS. 4B and 4C, respectively. The pressure at point 1 then sharply rises at time 4D corresponding to FIG. 4D when the reflected compression wave reaches point 1 and subsequently decreases after time 4D. FIG. 5B shows how pressure at point 2 rises just before time 4B as the compression wave 50 passes through point 2, goes down, then rises again just before time 4C as the reflected compression wave 50' passes, and then the pressure goes down again. FIG. 5C shows how point 3 merely has the one pressure spike from the compression wave's impact and reflection off of the closed aperture $38_{close}$.

Figure 1D:
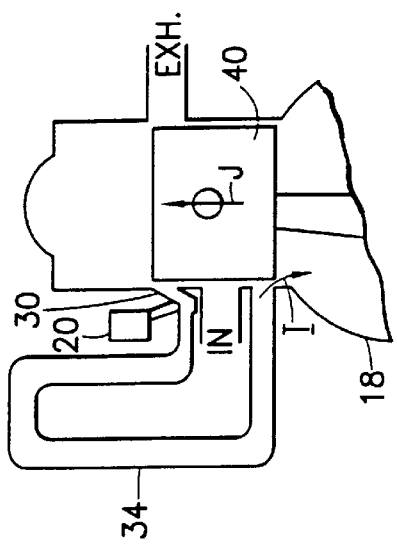

As the reflected compression wave 50' exits the inlet 30 it causes the fuel and air in the cylinder 12 to be greatly disturbed; in effect functioning as a shock wave. This helps to atomize the fuel and distribute the fuel better in the air. In addition, the reflected compression wave assists in removing fuel droplets that might be adhering to tips or edges of the inlet 30 by surface adhesion or surface tension. The compression wave shocks the fuel off of the surface and into the cylinder 12. The compressed air 44 continues to push out the inlet 30 until the inlet is closed by the piston head again as shown in FIG. 1D. The residual air in the accumulator 34 after the inlet 30 is closed, just after 1D, is still pressurized. The inlet 30 completely closes shortly before the exhaust outlet 28 is closed at EC. The aperture 38 opens at substantially the same time the aperture 30 is closed. However, in alternate embodiments opening of the aperture 38 could be configured to occur before the aperture 30 is closed or, alternatively, after the aperture 30 is closed. The opening of the aperture 38 functions as a blow off port to relieve residual pressure from the compressed air in the accumulator 34 back into the crankcase 18 as shown by arrow I in FIG. 1D. Relieving pressure from the accumulator 34 when the inlet 30 is closed prevents an excessive amount of fuel from being pushed between the piston head 40 and the inside cylinder wall that could otherwise raise hydrocarbon emissions.

Figure 1E:
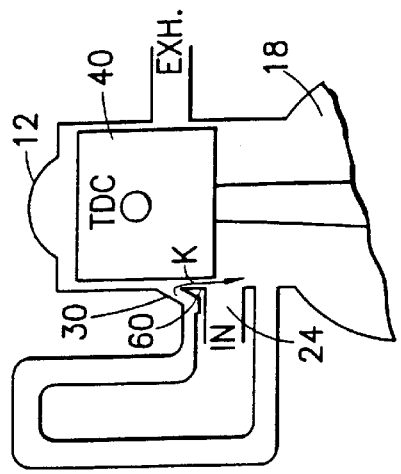

With the piston head 40 rising as shown by arrow J in FIG. 1D towards the TDC position, crankcase pressure E drops below 1 atmosphere as seen in FIG. 3. Thus, when aperture 38 is opened, not only is pressure in the accumulator 34 relieved, but a vacuum pressure is created in the accumulator 34. This vacuum pressure is used to pull fuel from the fuel metering device 20 and thus assist in delivering fuel into the accumulator. As seen in FIG. 3, the pressure F in the accumulator 34 now generally matches the pressure E in the crankcase 18 once again. Referring also to FIG. 1E the piston head 40 is shown at its TDC position. The air inlet 24 was opened at point IO. In this embodiment the inside wall of the cylinder 12 has a groove 60 between the inlet 30 and the inlet 24. This provides a path for a small amount of fuel (containing lubricant) to pass through the groove 60 as indicated by arrow K and lubricate bearings in the piston and crankshaft. However, the groove need not be provided. In an alternate embodiment a hole could be provided between the inlet 24 and the inlet 30 which would be spaced from the inside wall of the cylinder to deliver lubricant behind the piston head. The engine 10 could have an additional or alternative lubrication system.

Figure 6:
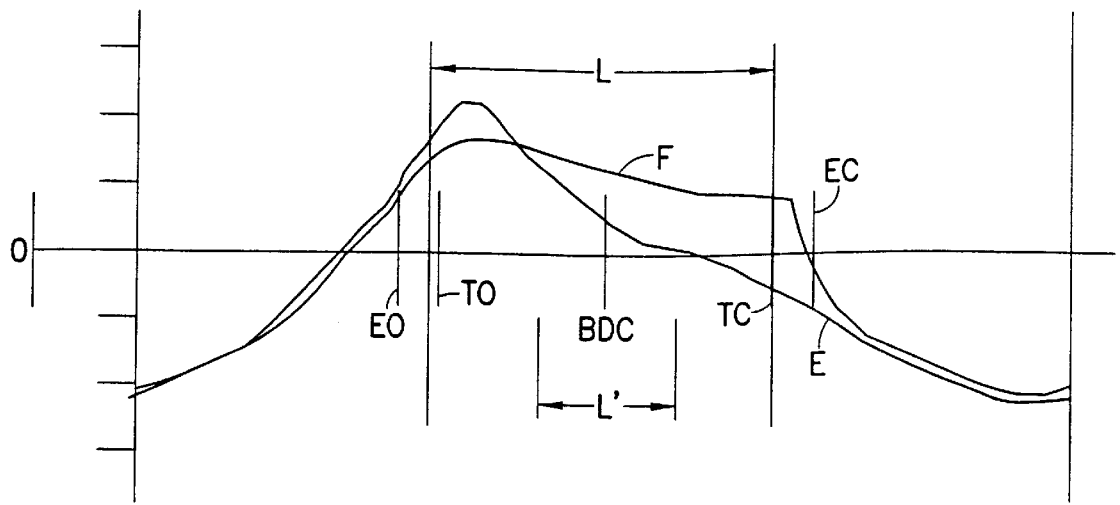
FIG. 6 is a graph as in FIG. 3 when a misfire occurs.

As is known in the art for small two stroke engines, misfires (i.e.: no combustion in the combustion chamber) can occur as much as one-third of the time. If a misfire occurs in the engine 10 a compression wave will not pass into the accumulator 34. Referring to FIG. 6 a graph of pressures E and F similar to FIG. 3 is shown when there is a misfire. L illustrates the injection period when the inlet 30 is open. The pressure F increases until the inlet 30 is opened and then it gradually decreases as the compressed air in the accumulator 34 exits the inlet 30 into the cylinder. After the inlet 30 is closed and the aperture 38 is opened, the pressure F returns to about the same pressure E as the crankcase 18. In a preferred embodiment, after the injection port 30 opens, the pressure in the accumulator 34 blows down (by pressure release through the injection port 30) before the bottom port 38 opens. Thus, in this preferred embodiment, the port 38 merely functions as a charging port for the accumulator 34 (to charge the accumulator with pressurized air from the crankcase); not as a blowoff port. One of the features of the present invention is that the inlet aperture 30 can be sized to prevent the accumulator 34 from totally discharging into the cylinder 12. In other words, the accumulator 34 can be pressurized for the entire time that the inlet 30 is open such that compressed air is continually exerting pressure out the inlet 30 when the inlet 30 is open. This can occur regardless of whether there has been combustion or a misfire. In such a case, the bottom port 38 can also function as a blowoff port to relieve residual pressure from the accumulator 34 after the piston closes the injection port 30. Since the piston head 40 opens and closes all of the ports/channels 24, 28, 30, 38, 42, the engine 10 can be designed to provide different performance characteristics by changing the positions of the ports/channels 24, 28, 30, 38, 42 relative along the length of the cylinder and/or relative to each other along the length of the cylinder. This can change the timing of how long the accumulator is charged with compressed air from the crankcase, how long the accumulator blows off, how long the accumulator injects into the cylinder, etc. This can also change pressure rate changes, such as if the transfer channel, exhaust outlet or air inlet open sooner or later in the piston cycle.

Features of the above-described embodiment of the present invention have been tested on a 25 cc engine having a 75° angled injector aperture located 0.1 inch above the top of the transfer channel 42, a combined charge and blow off aperture located 0.05 inch below the bottom of the intake channel, an open air inlet, 1 psi fuel pressure with a single diaphragm fuel pump. For an average low speed of 2430 rpm, the engine produced the following:

| FUEL (g/hr) | CORRECTED POWER (KW) | HC FID (ppm) | HC (g/hr) |
|---|---|---|---|
| 64.466 | 0 | 28410.03 | 26.81 |

Where HC is hydrocarbon emission; and HC FID is total hydrocarbon emission in $C_1H_{1.85}$ equivalent as measured by a flame ionization detector. For an average high speed of 7487 rpm, the engine produced the following:

| FUEL (g/hr) | CORRECTED POWER (KW) | HC FID (ppm) | HC (g/hr) |
|---|---|---|---|
| 332.448 | 0.728 | 8438.31 | 26.97 |

This resulted in a total HC emission of 31.59 g/bhp*hr (grams/brake horse power*hour), total CO emissions of 77.25 g/bhp*hr (grams/brake horse power*hour), and total $NO_x$ emissions of 1.41 g/bhp*hr (grams/brake horse power*hour). For the average high speed (wide open throttle) average HC emission was 28.38 g/bhp*hr; average FC was 0.731 lb/hr; and average BSFC was 0.769 lb/bhp*hr, where FC is fuel consumption and BSFC is brake specific fuel consumption.

Another test of the same engine, but at a rich fuel setting was also conducted. For an average low speed of 3513 rpm, the engine produced the following:

| FUEL (g/hr) | CORRECTED POWER (KW) | HC FID (ppm) | HC (g/hr) |
|---|---|---|---|
| 79.534 | 0 | 37947.69 | 34.46 |

For an average high speed of 7496 rpm, the engine provided the following:

| FUEL (g/hr) | CORRECTED POWER (KW) | HC FID (ppm) | HC (g/hr) |
|---|---|---|---|
| 391.192 | 0.800 | 13146.97 | 42.05 |

This resulted in a total HC emission of 44.18 g/bhp*hr. In addition, total CO emission was 198.1 g/bhp*hr and total NOx emission was 1.098 g/bhp*hr. In a lean setting a total HC emission of 28.69 g/bhp*hr was obtained.

Additional test numbers were taken as follows:

| Engine Speed RPM | Fuel lb/hr | Observed hp | Intake deg. F. | SPGT deg. F. | CO % | CO2 % | O2 % | NOx ppm | HC ppm |
|---|---|---|---|---|---|---|---|---|---|
| 7460 | 0.609 | 0.74 | 88 | 441 | 0.44 | 8.48 | 9.00 | 99.9 | 8581.9 |
| 7478 | 0.668 | 0.85 | 90 | 457 | 1.02 | 9.30 | 7.51 | 133.9 | 8263.4 |
| 7494 | 0.699 | 0.89 | 93 | 469 | 1.54 | 9.42 | 6.91 | 140.8 | 8796.4 |
| 7495 | 0.722 | 0.90 | 93 | 475 | 1.94 | 9.40 | 6.60 | 144.5 | 10426.8 |
| 7503 | 0.753 | 0.93 | 95 | 477 | 2.53 | 9.15 | 6.43 | 136.9 | 11374.2 |
| 7511 | 0.795 | 0.98 | 100 | 475 | 3.16 | 8.91 | 6.28 | 132.1 | 12067.9 |
| 7512 | 0.817 | 0.98 | 108 | 475 | 3.61 | 8.69 | 6.17 | 118.7 | 13004.9 |

Figure 7:
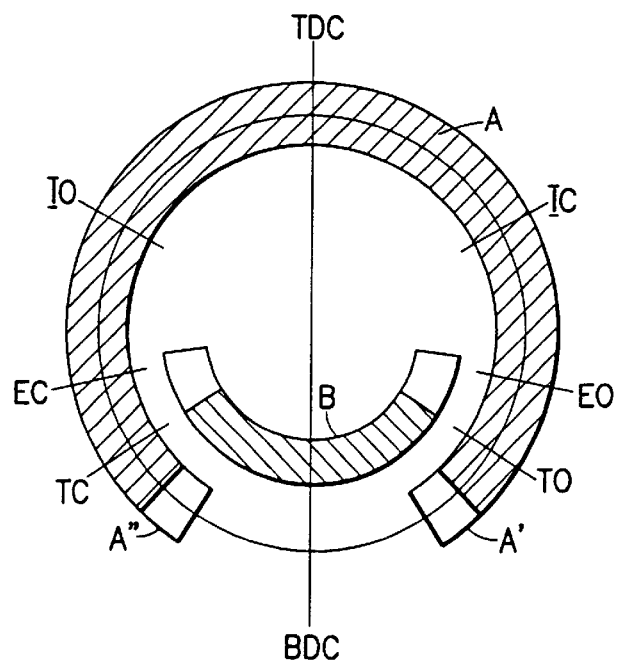
FIG. 7 is a diagram as in FIG. 2 of an alternate embodiment of the engine.

Referring now to FIG. 7, a graph similar to FIG. 2 is shown of when the two accumulator apertures are opened and closed for an alternate embodiment of the engine. In this embodiment of the engine the compressed air and fuel injection aperture is farther away from the top of the cylinder than shown in FIG. 1A. Thus, the compressed air and fuel injection aperture opens and closes at areas A' and A" closer to the BDC position of the piston head. The transfer channel is opened at TO before the injection port is opened at A' and the transfer channel is closed at TC after the injection port is closed at A". This provides an injection period L' as shown in FIG. 6. With the present invention both closures A and B can be selected merely based upon location of their respective apertures along the length of the cylinder. However, in alternate embodiments, alternative or additional means could be used to open and/or close the two accumulator ports.

Figure 8:
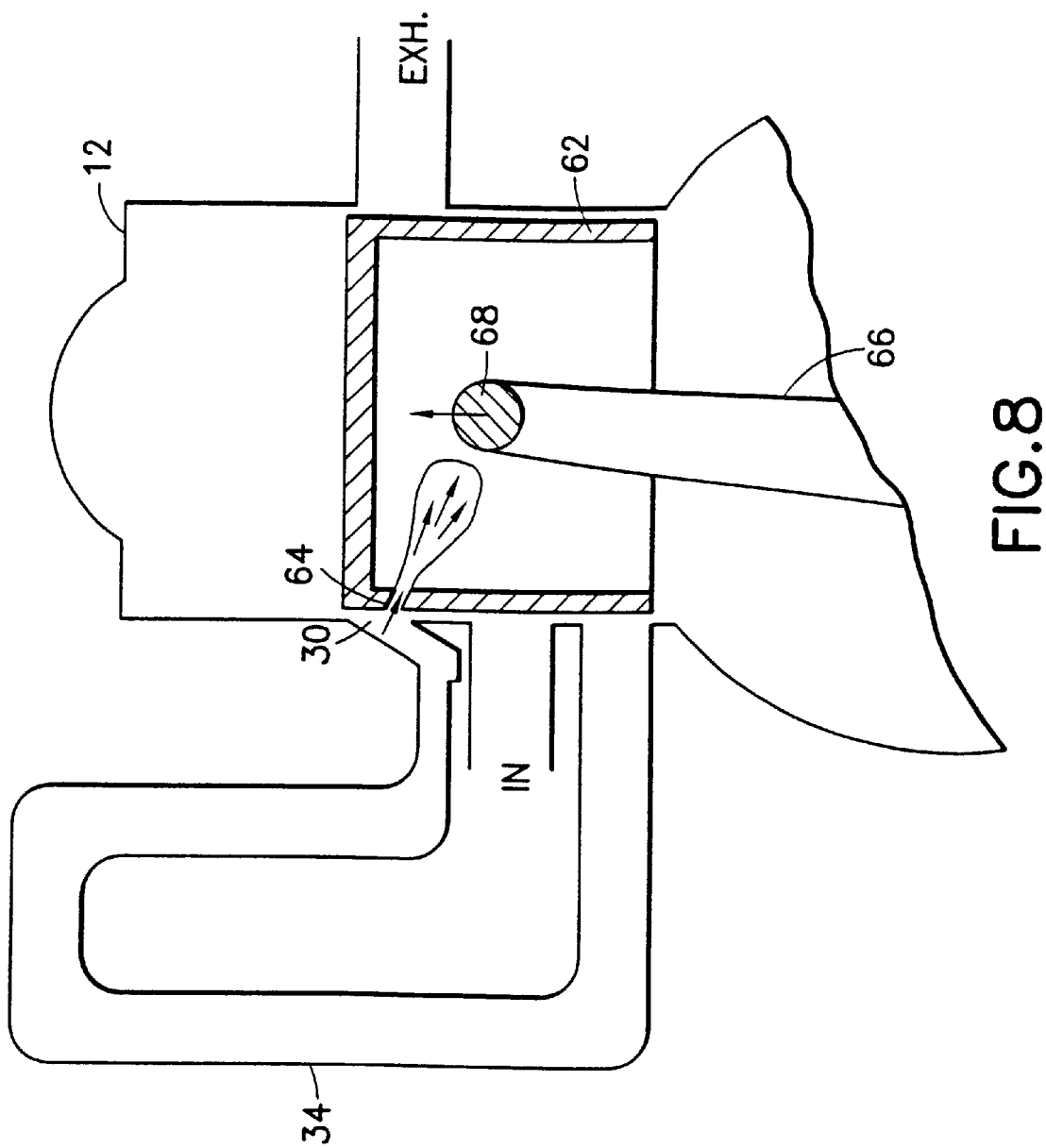
FIG. 8 is a partial schematic diagram similar to FIG. 1D of an alternate embodiment with a cross-sectional view of the piston head.

Referring now to FIG. 8, an alternative embodiment of a lubrication system for the engine is shown. In this embodiment the piston head 62 has a hole 64 through its side wall into its interior. The hole 64 is alignable with the inlet aperture 30 such that fuel (with its lubricant) can pass from the aperture 30, through the hole 64, and into the interior of the piston head 62. The piston head 62 is connected to a piston rod 66 by a bearing 68. The lubricant passing into the interior of the piston head 62 can also directly lubricate the bearing between the crankshaft and the piston rod 66. Although this type of lubrication system will increase hydrocarbon emissions, the increase is very small and, therefore, still allows the engine to pass upcoming new governmental hydrocarbon emission standards.

Figure 9:
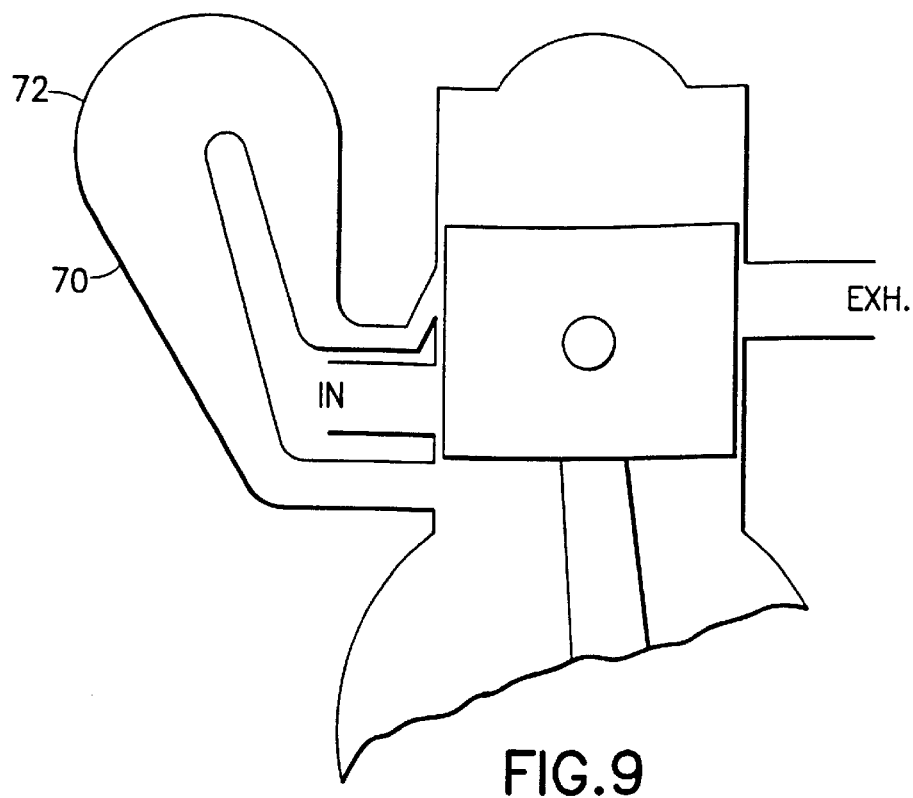
FIG. 9 is a partial schematic diagram of an engine with an alternate embodiment of the accumulator.

Referring now to FIG. 9 the engine is shown with an alternate embodiment of the accumulator conduit 70. As noted above, the accumulator functions as both a compressed air accumulator and as a tuned reflection pipe. In this embodiment the accumulator conduit 70 has an expansion chamber section 72 which is adapted to enlarge the length of the reflected compression wave relative to the length of the initial compression wave. Thus, the reflected compression wave is spread out over a longer period of time for a second pressure spike which is longer in time than $F_2$ shown in FIG. 3. The accumulator conduit can be configured to provide any suitable tuned pipe enhancement of the original compression wave.

Figure 10:
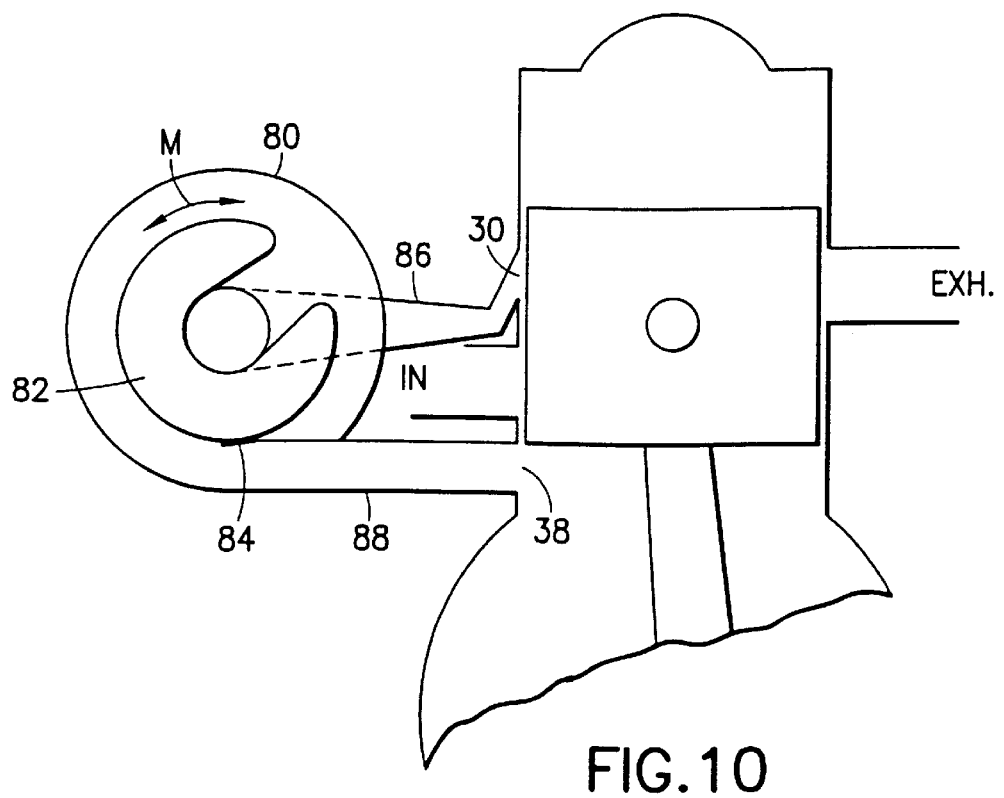
FIG. 10 is a partial schematic diagram of an engine with another alternate embodiment of the accumulator.

Referring now to FIG. 10 the engine is shown with another alternate embodiment of the accumulator 80. In this embodiment the accumulator 80 provides a continually variable length tuned pipe which is continually variable based upon the speed of the engine. The accumulator 80 has a rotatable inner pipe member 82, a sliding seal 84, a first pipe section 86 between the injection aperture 30 and the inner pipe member 82, and a second pipe section 88 between the aperture 38 an the inner pipe member 82. The inner pipe member 82 is rotatable as indicated by arrow M to vary the effective pipe length between the two apertures 30, 38. Any suitable means could be provided to rotate the inner pipe member 82 based upon the speed of the engine, such as a mechanical connection to a throttle or an electronic control device. In another alternate embodiment a sliding trombone type of variable length accumulator conduit could be provided.

The system as described above provides numerous new features. The small size of the injection aperture 30 allows for a sustained injection regardless of whether combustion occurred immediately before the injection cycle. The accumulator is a closed end system during the injection cycle for reflection purposes. The transfer channel can be opened before introduction of the fuel into the combustion chamber. Pressure in the accumulator is relieved or blown off in every cycle of the piston thereby reducing fuel leakage between the piston head and the cylinder wall from the injection port. Vacuum drawing of fuel into the accumulator proximate the injection inlet 30 can be used to simplify the type of fuel pump used, such as use of a simple diaphragm fuel pump. The length and shape of the accumulator conduit system can take advantage of the compression wave to deliver a reflected compression wave for enhanced fuel and compressed air delivery through the injection inlet 30. The reflected compression wave can atomize fuel in the inlet 30, push the injection through the inlet 30 faster, and also atomize fuel against substantially static air all ready in the combustion chamber. Thus, there is provided an accelerated late delivery of a portion of the fuel charge which is inherent to the present system. This late delivery reduces the amount and likelihood of unburned fuel short circuiting directly to the exhaust 28. Thus, hydrocarbon emissions are reduced. The reflected compression wave can be delivered to the injection aperture at the end of scavenging after BDC. The accumulator conduit has two variably open and closed ends to provide a closed end tuned pipe function as well as a compressed air accumulator function and an accumulator blow off pressure relieve function. Because of the opening and closing natures of the apertures 30, 38, no direct open path is provided between the cylinder and the crankcase by the accumulator. The tuned pipe feature of the accumulator conduit can be tuned, such as with an expansion chamber, to spread out the reflected compression wave to compensate for varying speeds of the engine. Fuel trapping is enhanced to about 80%–95%. Thus, fuel trapping losses can be as low as only 5%. In old style systems fuel trapping was only about 60%–70%. The present system has better fuel efficiency because of reduced combustion loss and reduces occurrences of misfires because of better fuel mixing from the reflected compression wave. The present invention can also be used as a self governing effect to prevent overspeed of an engine, such as in a chain saw, because the tuned pipe feature of the accumulator conduit can go out of tune at overly high speeds, thus losing the appropriate timed delivery of the fuel ramming feature of the reflected compression wave.

Figure 11:
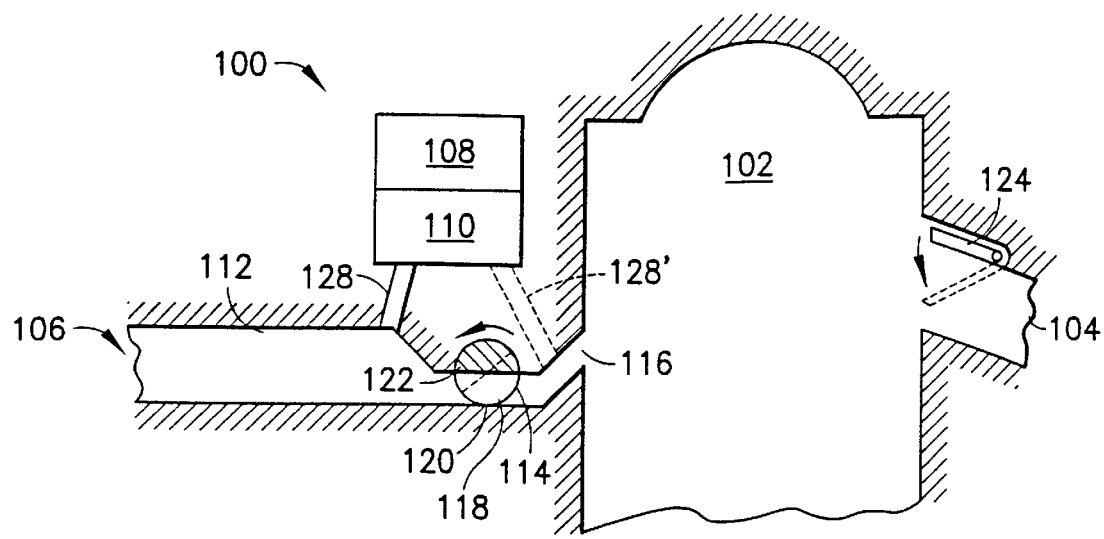
FIG. 11 is a schematic illustration of a portion of an engine of an alternate embodiment incorporating features of the present invention.

Referring now to FIG. 11 an alternate embodiment of the present invention will be described. In this embodiment the engine 100 includes a cylinder forming a combustion chamber 102, an exhaust port 104, a fuel delivery system 106 and other components (not shown) such as a piston and spark plug. The fuel delivery system 106 generally comprises a fuel pump 108, a fuel metering system 110, an accumulator 112 and a movable member 114. The accumulator 112 can be any suitable type of accumulator such as those described in FIGS. 1A–10 or U.S. patent application Ser. No. 09/518,578 which is hereby incorporated by reference in its entirety. The accumulator 112 has an injection port 116 into the cylinder. The accumulator 112 forms a combustion compression wave reflection conduit similar to that disclosed with reference to FIGS. 1A–10. However, in this embodiment the movable member 114 is located to at least partially open and close a path through a portion 120 of the conduit 112 as the movable member 114 is moved. In this embodiment the movable member 114 generally comprises a shaft with a non-uniform cross-section having a cut-out section 118. The shaft is axially rotatable. The cut-out section 118 is preferably about the same size as the portion 120 of the conduit 112 such that, when the cut-out section 118 is aligned with the flow path through the portion 120, the flow path through the portion 120 is substantially unobstructed by the movable member 114. However, when the movable member 114 is axially rotated from its home unobstructing position shown in FIG. 11, a section 122 of the shaft 114 moves into the conduit flow path at the portion 120 to thereby at least partially restrict or narrow the flow path at the shaft 114 (as illustrated by the dotted line in FIG. 11).

The method in which an accumulator reflection pipe functions has been described above with reference to FIGS. 1A–10. The accumulator reflection pipe 112 can function substantially the same way when the shaft 114 is at its home unobstructing position. However, by moving the shaft 114 to a partially obstructing position the reflected combustion compression wave shape and timing of delivery to the injection port 116 can be changed versus when the shaft 114 is at its home position. The partial obstruction by the shaft 114 can lower the pressure peak height of the reflected wave delivered to the port 116 and lengthen the time of the delivery of the reflected wave to the port 116. In a preferred embodiment or method the shaft 114 would be at its home unobstructing position while the engine is operating at wide open throttle (WOT) and the shaft 114 would be at a partially obstructing position while the engine is operating at idle and, perhaps, light load or slow speed non-idle positions. This can help to decrease emissions, such as release of unburned hydrocarbons, from the engine during idle and slow speed engine operation by improved fuel trapping in the combustion chamber 102 and deceased unburned fuel travel directly across the combustion chamber from the port 116 to the exhaust port 104. To further increase trapping the exhaust port 104 can comprise a movable exhaust valve 124. However, in an alternate embodiment the exhaust valve need not be provided. In the embodiment shown in FIG. 11 the fuel entry 128 from the fuel metering device 110 into the channel 112 is provided behind the shaft 114. However, in an alternate embodiment the fuel entry could be provided between the movable member 114 and the injection post 116 as illustrated by 128'.

Figure 11A:
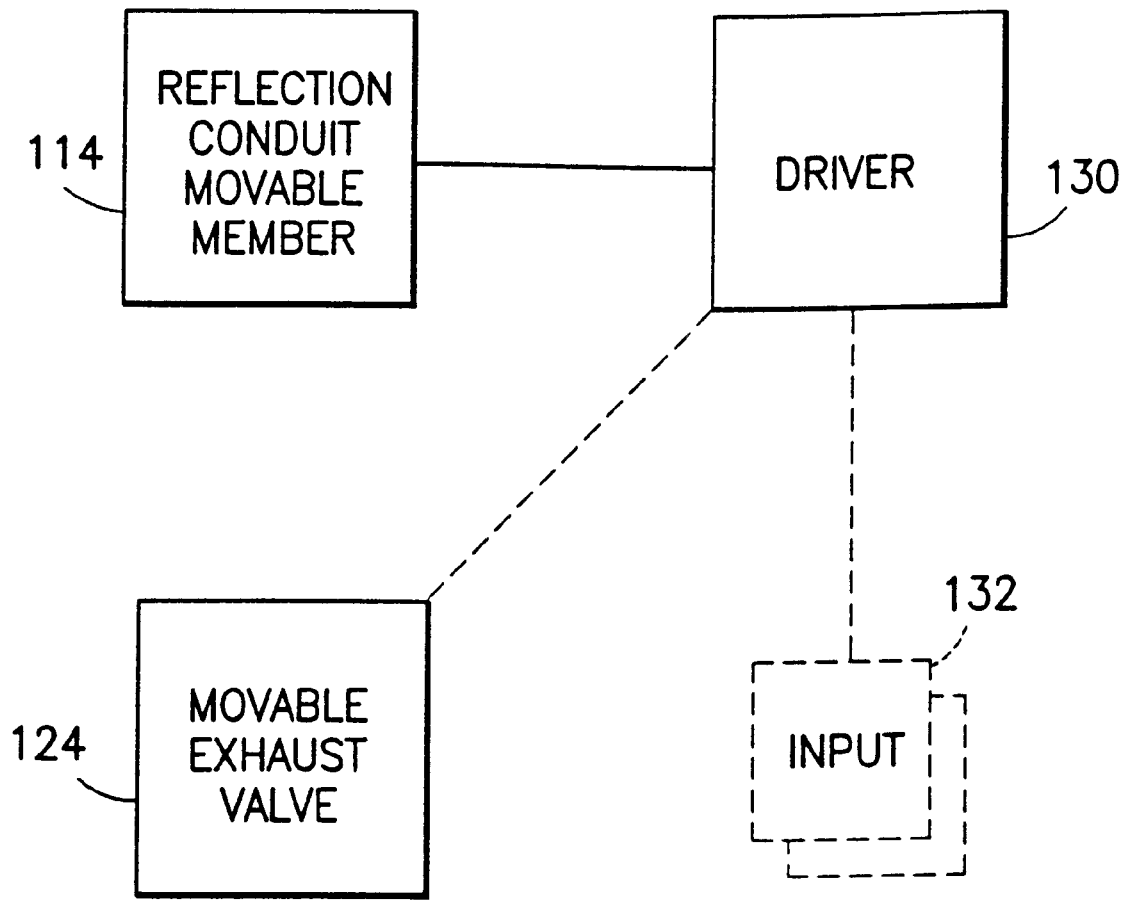
FIG. 11A is a block diagram of a control system used to move the movable member shown in FIG. 11.

Referring also to FIG. 11A, the accumulator movable member 114 is preferably connected to a driver or mover 130 which is adapted to move the movable member 114. The driver 130 could comprise any suitable type of driver such as a manual control, a mechanical linkage, an electromechanical device, and/or an electrical device, such as a computer or microprocessor. If a manual control, the driver 130 could merely be a user actuated lever or knob connected to the shaft 114. If a mechanical linkage, the driver 130 could be connected to the throttle lever, or the throttle shaft, or the choke valve lever or shaft, or an engine or vehicle speed governor or sensor. The system can have one or more inputs 132 such as sensors to supply predetermined information to the driver 130. If the driver includes a computer the computer could have programming to move the member 114 to predetermined positions based upon the information supplied by the input(s) 132. Thus, the driver 130 could automatically move the movable member based upon a predetermined parameter(s). The driver 130 could also be connected to the exhaust valve 124 to at least partially coordinate movements of the two members 114, 124 relative to each other. However, in alternate embodiments any suitable type of driver could be provided.

Figure 12:
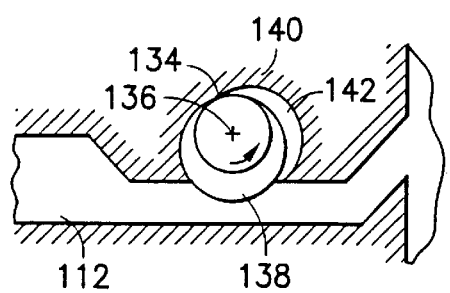
FIG. 12 is a schematic illustration similar to FIG. 11 of an alternate embodiment of the movable member.

FIG. 11 illustrates one type of movable member for varying the size of the path through a portion of the combined accumulator and reflection pipe. However, any suitable type of path varying member or reflection wave attenuating member could be provided for the conduit 112. FIGS. 12–16 illustrate some examples of various different types of alternative movable members. In FIG. 12 the movable member 134 comprises an axially rotatable shaft having a center of rotation 136 and a section 138 which extends in a non-uniform distance from the center of rotation 136. The frame 140 includes a pocket 142 adjacent the reflection conduit 112. When the shaft 134 is rotated the section 138 can be moved into and out of the pocket 142 and the reflection conduit 112. When the section 138 is in the pocket 142, the conduit 112 is substantially unobstructed by the shaft 134. When the section 138 is moved into the conduit 112, the path through the conduit 112 at the shaft 134 is made smaller.

Figure 13:
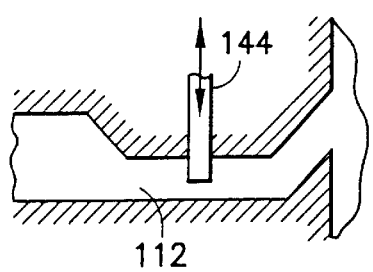
FIG. 13 is a schematic illustration similar to FIG. 12 of another alternate embodiment of the movable member.
Figure 14:
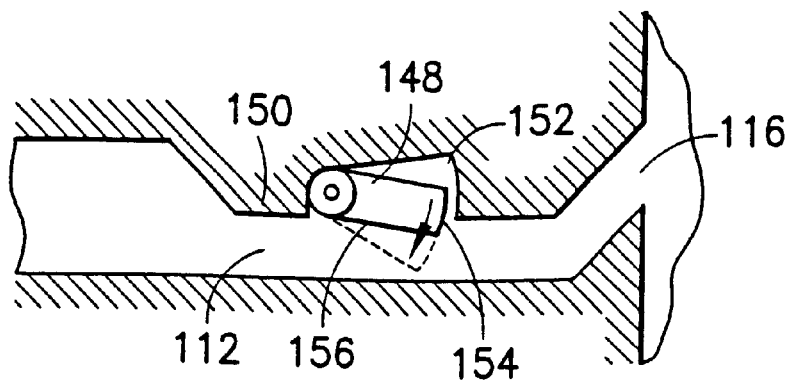
FIGS. 14–16 are schematic illustrations of other possible alternate embodiments of the movable member.
Figure 15:
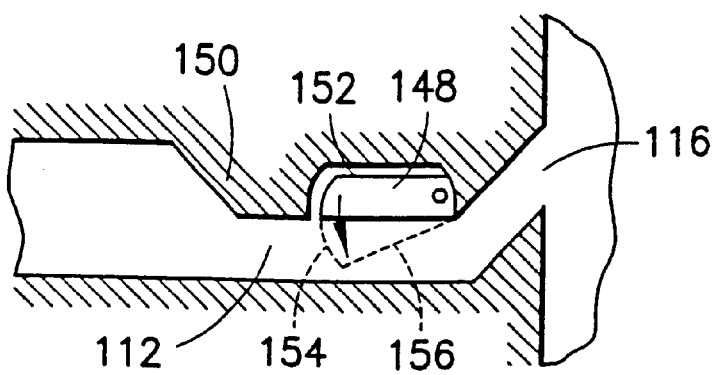
Figure 16:
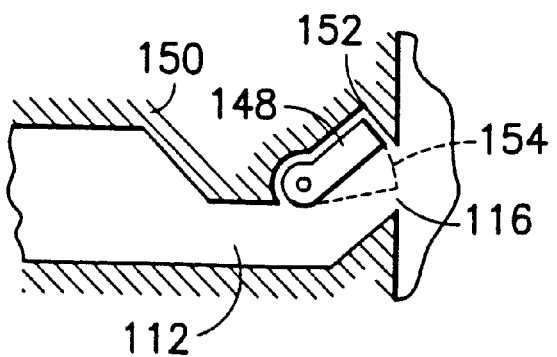

In FIG. 13 the movable member 144 comprises a slidable member or gate which can be longitudinally slid into and out of the conduit 112. In FIGS. 14–16 the movable member 148 comprises a pivotable gate or flap. The frame 150 has a pocket 152 for receiving the flap 148 in its retracted, unobstructing position. The flaps 148 are pivotable from their retracted positions in their pockets 152 to extended positions which extend into the reflection conduits 112. In the embodiment shown in FIG. 14 the flap 148 is orientated to have a relatively blunt distal end 154 face the port 116 and an elongated side 156 face the opposite direction. In the embodiment shown in FIG. 15 the flap 152 rotates in the opposite direction from FIG. 14 such that side 156 can face the port 116 and end 154 can face the opposite direction. In FIG. 16 the flap 148 is located proximate the port 116 such that the end 154 can be moved into the port 116. These embodiments are merely illustrative of the invention. Any suitable embodiments could be provided to vary the shape or timing of delivery of the reflection wave out the port 116 and/or initial combustion wave through the conduit 112 and/or volume 46 (see FIGS. 4A–4D) into the port 116. The present invention could also be used with the variable effective length reflection pipes disclosed in U.S. Pat. No. 6,293,235 which is hereby incorporated by reference in its entirety.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. In an internal combustion engine having a combustion chamber and a fuel delivery system for delivering fuel into the combustion chamber, the improvement comprising:

The fuel delivery system including a fuel entry proximate the combustion chamber, a combustion compression wave reflection conduit connected to the combustion chamber proximate the fuel entry, and a movable member located proximate the reflection conduit for at least partially opening and closing a path through the reflection conduit.

2. An engine as in claim 1 wherein the movable member comprises a rotatable shaft extending at least partially across the reflection conduit.

3. An engine as in claim 2 wherein the shaft comprises a non-uniform cross-section at the reflection conduit relative to an axis of rotation of the shaft.

4. An engine as in claim 1 wherein the movable member is slideable into and out of the reflection conduit.

5. An engine as in claim 1 wherein the movable member comprises a flap movable in the reflection conduit between an extended position and a retracted position.

6. An engine as in claim 5 wherein the reflection conduit comprises a recess for receiving the flap in its retracted position.

7. An engine as in claim 1 further comprising a mover for automatically moving the movable member based upon a predetermined parameter.

8. An engine as in claim 1 further comprising a manual mover connected to the movable member allowing a user to manually move the movable member.

9. An internal combustion engine fuel delivery assist comprising:

a combustion compression wave reflector comprising a conduit; and a control system connected to the reflector for at least partially controlling the reflector to vary timing or shape of delivery of a reflected combustion compression wave to a predetermined location of an engine, wherein the control system comprises a movable member which is movable relative to the conduit to vary a size of a compression wave path through a portion of the conduit.

10. A fuel delivery assist as in claim 9 wherein the movable member comprises a rotatable shaft extending at least partially across the conduit.

11. A fuel delivery assist as in claim 10 wherein the shaft comprises a non-uniform cross-section at the conduit relative to an axis of rotation of the shaft.

12. A fuel delivery assist as in claim 9 wherein the movable member is slideable into and out of the conduit.

13. A fuel delivery assist as in claim 9 wherein the movable member comprises a flap movable in the conduit between an extended position and a retracted position.

14. A fuel delivery assist as in claim 13 wherein the conduit comprises a recess for receiving the flap in its retracted position.

15. A fuel delivery assist as in claim 9 wherein the control system comprises a mover for automatically moving the movable member based upon a predetermined parameter.

16. A fuel delivery assist as in claim 9 wherein the control system comprises a manual mover connected to the movable member allowing a user to manually move the movable member.

17. A method of delivering a pressure pulse in an internal combustion engine, the method comprising steps of:

producing a combustion compression wave from combustion in a combustion chamber of the engine;

conduiting at least a portion of the wave in a reflection pipe conduit connected to the combustion chamber;

reflecting the wave portion in the conduit back towards the combustion chamber; and varying timing of delivery or shape of the reflected wave portion from entry into the conduit back to an exit from the conduit into the combustion chamber, wherein the step of varying comprises moving a movable member in a path of the reflection pipe conduit to increase and decrease a path through the conduit.

18. A method as in claim 17 wherein the step of varying comprises changing an effective reflection length of the conduit.

19. A method as in claim 17 wherein the step of moving the movable member comprises axially rotating a shaft portion of the movable member.

* * * * *